Figure 1:
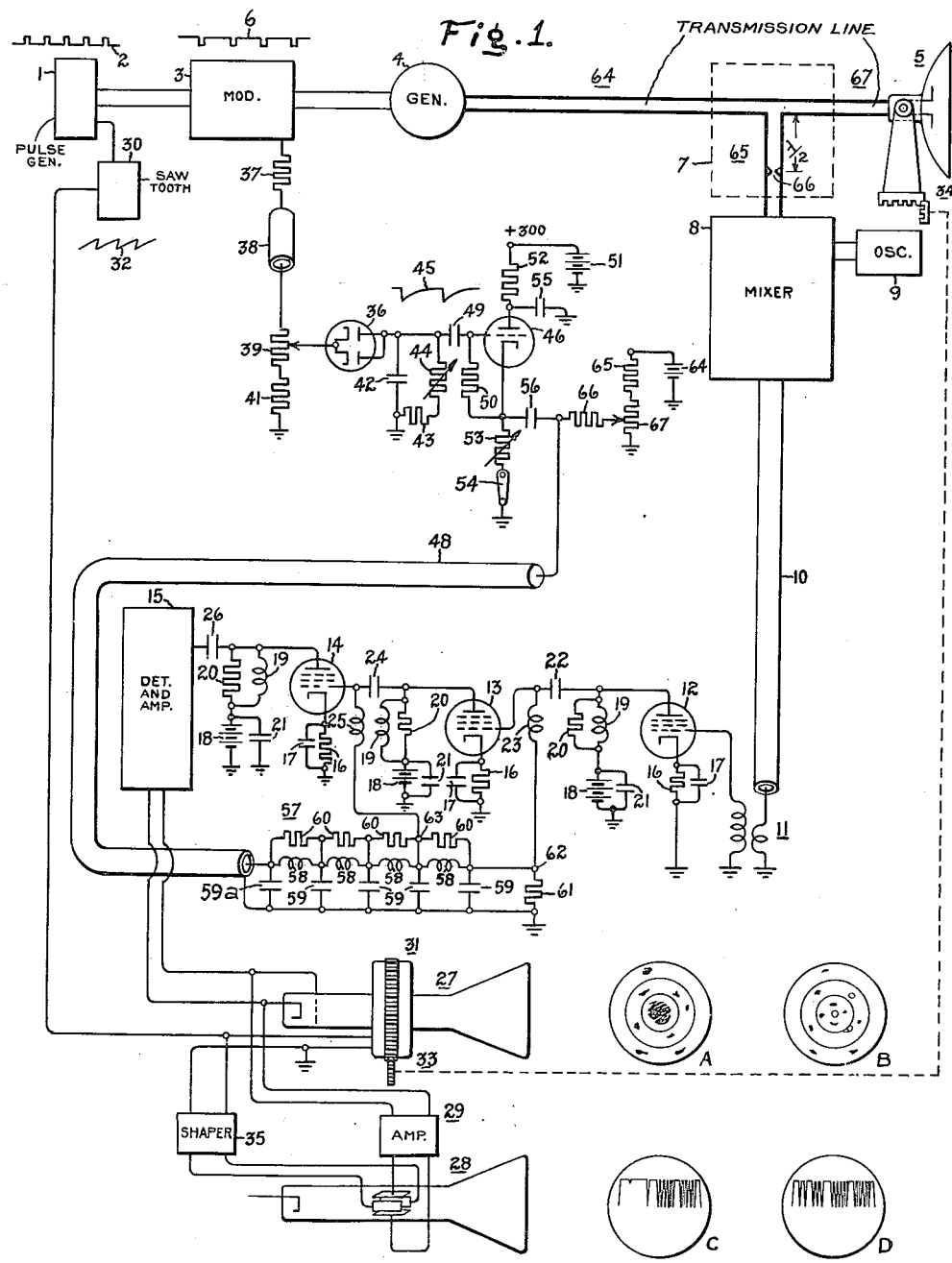

Inventors:
John E. Maynard,
Richard L. Shetler,
by Merton D. Moore
Their Attorney.

Patented July 8, 1952

2,602,922

UNITED STATES PATENT OFFICE 2,602,922

SENSITIVITY TIME CONTROL

John E. Maynard, Fulton, and Richard L. Shetler, Syracuse, N. Y., assignors to General Electric Company, a corporation of New York Application August 23, 1946, Serial No. 692,496

9 Claims. (Cl. 343—13)

Our invention relates to means for controlling the sensitivity of an electron discharge amplifier with time and more particularly to means for varying the operation of the receiver of a remote object detecting system in accordance with the distance to the remote objects detected.

In one type of remote object detecting system, recurrent pulses of radio frequency energy are transmitted in the direction of remote objects desired to be located. Reflected energy pulses from these objects are picked up by an appropriate radio receiving system and converted to a unidirectional voltage varying in accord with the intensity of the received waves. This voltage, together with a time-varying voltage indicating elapsed time after each transmitted pulse, is applied to a cathode ray device to produce an indication on the viewing screen thereof corresponding to the position of each remote object. In the so-called "Plan Position Indicator" type of image display, the cathode ray beam is moved in a radial direction from the center of the viewing screen after each transmitted energy pulse, the angular direction of this motion corresponding to the direction of maximum sensitivity of the apparatus and the intensity of the ray is increased at the instant of each received echo pulse. Luminous points are thus produced on the viewing screen to provide a map-like indication of the position of remote objects relative to the system, each point having a radial distance from the center of the viewing screen determined by the distance to the corresponding remote object and having an angular direction from the center thereof varying in accordance with the direction of the object relative to a predetermined axis through the equipment.

It is an object of our invention to provide improved means whereby the sensitivity of the receiving system of a remote object detecting system is varied in accordance with the time interval after the last transmitted energy pulse so that the unidirectional output voltage of the receiving system is dependent primarily on the energy reflecting properties of the corresponding remote reflecting object and is relatively independent of the distance thereto.

It is a further object of our invention to provide improved means capable of controlling the gain of a radio receiver in a manner suitable for use in a radio type pulse-echo object detecting system.

Another object of our invention is to control the gain of the receiving system of a pulse-echo type, remote object detector so as to compensate accurately for the inherent changes in echo strength with distance and to provide a signal suitable for use with the P. P. I. type of image display.

Further, it is an object of our invention to provide improved means whereby the gain of a plurality of coupled amplifier stages may be controlled simultaneously while at the same time avoiding undesired coupling between stages.

The novel features which we believe to be characteristic of our invention are set forth with particularity in the appended claims. Our invention itself, both as to its organization and method of operation may best be understood by reference to the following description taken in connection with the accompanying drawings in which Fig. 1 is a schematic diagram of the circuits utilized in one embodiment of our invention and Fig. 2 is a series of curves illustrating the operation thereof.

Figure 2:
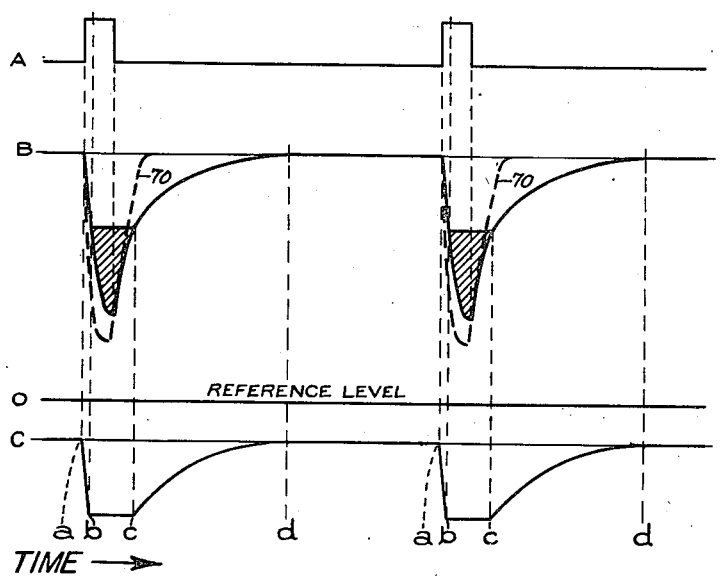

Figure 1 shows a radio pulse-echo apparatus embodying the features of this invention. It is the purpose of unit 1 to generate recurrent voltage pulses signifying the successive instants of time when it is desired to transmit a radio frequency energy wave, this voltage having generally the wave shape shown at 2. Voltage from unit 1 is applied to modulator 3 which reverses the polarity thereof, to produce a wave shape as indicated by curve 6, and simultaneously increases the power level thereof to a value sufficient to drive a radio frequency generator 4. The latter device may, for example, consist of a magnetron having its anodes at ground potential and cathode driven negative by the voltage pulses from modulator 3. Radio frequency energy from generator 4 is applied to a directional radiating system shown generally at 5 to project into the area containing remote objects a pulse of radio frequency energy.

Radio frequency energy pulses projecting from antenna 5 travel to remote objects and are reflected or reradiated thereby to produce return energy pulses traveling in the opposite direction. These pulses are received by antenna 5 and are applied to mixer 8 through device 7, commonly known as a "Transmit-Receive Box," or "T. R. box." It is the function of the device 7 to protect mixer 8 from the high energy, radio frequency pulses produced by generator 4 while at the same time permitting energy to pass from antenna 5 to mixer 8 when generator 4 is inactive. An illustrative T. R. box construction is shown diagrammatically within the dashed lines indicating the position of T. R. box 7. In this construction, the transmission lines from generator 4 to antenna 5, shown generally as an open wire lines 64 and 67 are connected with mixer 8 through transmission line 65. A spark or discharge gap 66 is located at a point approximately one half wave length from the junction of the lines. In operation, a transmitted energy pulse appearing on line 64 causes voltage to appear across gap 66 producing break-down thereof. This causes transmission line 65 to appear as a half-wave, short-circuited line at the point of connection with transmission lines 64 and 67. As the impedance presented by such a line is very small, this permits efficient energy transfer from generator 4 to antenna 5. When the gap is discharging, very little energy passes beyond this point in transmission line 65 so that the transmitted energy pulses do not overload mixer 8. However, when the pulse disappears, gap 66 deionizes, thereby making the receiver sensitive to energy appearing at antenna 5. This deionization is not instantaneous but takes place relatively rapidly as compared to the pulse repetition rate. Therefore received echo pulses can be applied to mixer 8 a short interval after each transmitted pulse. During the deionization period, the attenuation is still high so that only the strongest received signals are transmitted to the receiver. Generator 4 is arranged to cause transmission line 64 to present a relatively low impedance across the junction of the transmission lines in order to provide maximum transfer of energy from antenna 5 to mixer 8 during reception of echo pulses after the main transmitted pulse has terminated.

It is the purpose of mixer 8 to convert the received radio-frequency energy pulses reflected from remote objects to pulses having convenient frequency for amplification. To this end, oscillations from unit 9 are applied to the mixer simultaneously with oscillations from antenna 5, the frequency of the former oscillations differing in frequency from the latter by a value corresponding to the desired intermediate frequency. The resultant beats produce oscillations of intermediate frequency which are applied through transmission line 10 and transformer 11 to the first intermediate frequency amplifier 12.

Electron discharge devices 12, 13, and 14 and the associated circuits comprise intermediate frequency amplifiers. Corresponding elements of each stage have been given corresponding reference numerals. In each of these stages, grid bias voltage is derived from cathode resistance 16 and bypass capacitor 17 whereas anode voltage is derived from unidirectional voltage source 18 and radio frequency choke coil 19. Each choke coil is bypassed by a resistance 20 to provide suitable bandwidth of the amplifier and each voltage source 18 is bypassed by a capacitor 21 to prevent a radio frequency voltage drop thereacross. The screen and suppressor grid electrodes in devices 12, 13, and 14 are provided with suitable biasing potentials from appropriate voltage sources (not shown) in conventional manner.

Oscillations from mixer 8 are amplified in amplifier 12 and applied through coupling capacitor 22 and tuned grid coil 23 to electron discharge device 13. The resultant amplified oscillations are then applied to device 14 by coupling capacitor 24 and tuned grid coil 25. Further amplified oscillations from device 14 are applied to unit 15 through coupling capacitor 26. The tuning of grid coils 23 and 25 is accomplished by the distributed capacitance of these coils, together with the capacitance of the associated tubes, circuit elements, and wiring in a manner well known to the art.

It is the function of unit 15 to produce a unidirectional voltage varying in accordance with the envelope of the intermediate frequency voltage output of amplifier 14. It includes a detector and may also include additional intermediate-frequency and video-frequency amplifiers. The resultant unidirectional output voltages are applied to the control electrode of cathode ray device 27 to vary the intensity of the ray thereof and to unit 29 for further amplification and application to the vertical deflecting plates of cathode ray device 28. Hence, the intensity of the ray in cathode ray device 27 is varied in accordance with the echo radio energy received at antenna 5 and the vertical position of the ray of cathode ray device 28 is varied in accordance with this energy.

It is the purpose of unit 30 to generate a signal suitable for deflecting the ray of cathode ray device 27 in accordance with the time interval after each transmitted energy pulse. To this end, a saw tooth current wave 32 is produced by this unit, this wave being applied to the magnetic deflecting system 31 of device 27 to deflect the ray in a radial direction in accordance with the time after each transmitted energy pulse. Inasmuch as this time corresponds to the distance travelled by radio pulses projected from antenna 5 and reflected thereto by remote objects, the distance of the ray from the center of the viewing screen corresponds to the distance of objects producing radio echoes incident on antenna 5. The axis along which this radial deflection takes place is determined by the orientation of magnetic sweep coil 31 which is rotated by gears 33 and 34 to a position corresponding to the direction of antenna 5. Hence, as antenna 5 is rotated, each remote object produces a luminous spot on the viewing screen of cathode ray device 27 having a radial distance from the center thereof corresponding to the distance to that object and an angle with respect to a predetermined axis on the screen determined by the orientation of the object relative to the pulse-echo system. Images of this general type are shown at A and B, Fig. 1.

It is the purpose of unit 35 to convert the voltage across the deflecting coil 31 to a time-varying voltage suitable for use in the horizontal ray deflecting circuits of cathode ray device 28. That is, the voltage corresponding to saw tooth current wave 32 is converted to a saw tooth voltage wave having the same frequency and phase position but with wave shape determined by the distance scale desired on the viewing screen. This voltage is applied to the horizontal ray deflecting circuits of device 28 to cause the horizontal position of the ray thereof to correspond at all times to the time interval after the last transmitted energy pulse, and hence the distance to remote objects producing echoes at that time. Since unit 29 causes the vertical position of the ray of device 28 to correspond with the intensity of the received radio energy at device 5, the image formed on the viewing screen of device 28 consists of a series of vertical "pips," such as shown at C and D, Fig. 1. The position of each "pip" in the horizontal direction, measured from the left edge of the trace, is determined by the distance to the corresponding remote object and the vertical height of the "pip" is determined by the intensity of the radio echo.

The apparatus described thus far constitutes a known radio type remote object detecting system having both the so-called "P. P. I." type display and the "A" type display. In equipment of this type the intensity of the radio echoes received at the antenna varies in accordance with both the radio reflecting properties of the remote objects and the distances thereto. This results from the fact that attenuation and spreading of the radio waves is determined by the distance travelled. Consequently, if a particular reflecting object is located close to the pulse-echo equipment, the intensity of the radio echo is greater than if the same object is located some distance therefrom. Conversely, the radio echo from a slightly reflecting object, such as a water wave, close to the pulse echo system will be of equal or perhaps even greater intensity at antenna 5 than the echo from a more highly reflecting object, such as a ship, located at some distance from the system.

The variation in the intensity of the radio echoes with distance to the corresponding remote objects causes a masking or saturating action on the viewing screens of the cathode ray devices used to display the intelligence obtained by the system. In the P. P. I. display, the intensity of the image reaches the saturation value for a large number of small objects located near the equipment, a value of intensity that cannot be distinguished by the eye from the intensity of echoes from more remote objects. Hence the area close to the center of the screen is clouded as shown at the center of diagram A, Fig. 1, thus preventing identification of any individual highly reflecting objects such as ships or buoys within this region.

In the case of the "A" type presentation, the effect of echoes from slightly reflecting objects close to the pulse-echo equipment is to cause maximum deflection of the ray in the vertical direction. This deflection is limited by saturation of the receiving system and the limits imposed by the structure of the cathode ray device. Hence, in the region of the viewing screen corresponding to objects close to the detecting equipment, the cathode ray experiences sustained vertical deflection of maximum value and it is impossible to observe the presence and location of particular highly reflecting objects in this region. The condition of the viewing screen under these circumstances is indicated by the broad block pulse at the left side of diagram C, Fig. 1.

It is the purpose of devices 36 and 46 and the associated circuits to control the amplification or gain of electron discharge devices 13 and 14 with time and in a manner compensating for undesired changes in intensity of the echo waves at antenna 5. Waves from modulator 2 having wave form generally as shown at 6 are applied to diode electron discharge device 36 through a voltage divider comprising resistances 37 and 41, potentiometer 39, and transmission line 38, thus causing the voltage at the cathode of this device to vary in accord with this wave form and at a magnitude corresponding to the adjustment of these resistances. The negative voltage pulses of this wave cause the cathodes of device 36 to become negative relative to the anodes, thus causing current flow and charging condenser 42 in a direction to cause the ungrounded terminal thereof to become negative. When the pulse ceases, this charge leaks off through a path comprising fixed resistance 43 and adjustable resistance 44, the rate of discharge being determined by the values of these resistances and the capacity of capacitor 42. The resultant wave form across capacitor 42 is indicated at 45. It consists of a series of rapid voltage dips followed by relatively slow voltage recovery, each dip taking place at the instant of a pulse of wave 6.

It is the purpose of electron discharge device 46 and the associated circuits simultaneously to alter the wave form of wave 45 and to increase the power level thereof to a value suitable for application to low impedance transmission line 57. To this end, the cathode-anode space path of device 46 is connected in series with switch 54, variable resistance 53, resistance 52 and unidirectional voltage source 51 so that space path voltage appears thereacross. The anode of device 46 is held substantially at ground voltage potential for signal pulses by capacitor 55. Resistance 50 acts as a grid leak to supply unidirectional control electrode bias voltage to device 46.

When wave form 45 is applied to the control electrode of device 46 through coupling capacitor 49, the cathode-anode space current thereof is varied, this variation taking place in accordance with the actual control electrode-cathode space path voltage. However, the voltage applied to the control electrode of device 46 is made to exceed the anode current cut-off value when added to the negative voltage due to the charge on condenser 49 associated with grid leak resistance 50. Current flow is thereby cut off for a period of time following inception of each pulse of wave 45. This period may be adjusted by varying the value of the input pulse from potentiometer 39. After wave 45 has increased to a value permitting current flow in device 46, the voltage across resistance 53 swings positively in accordance with the shape of wave 45 during the remainder of the cycle.

Inasmuch as the output voltage from electron discharge device 46 is taken from resistance 53, the effective internal impedance of this circuit is made low to drive low impedance transmission line 57 properly. Signals accordingly pass through shielded cable 48 substantially without distortion and appear at artificial transmission line 57. Coupling capacitor 56 is chosen of sufficient capacity to have little effect on this wave form.

It is the purpose of artificial transmission line 57 to permit application of control voltage to devices 13 and 14 without introducing additional undesirable interstage coupling between the circuits of these devices and without distorting the control voltage wave form. To this end, each inductance 58 used in this transmission line is constructed to resonate with its distributed capacity at a frequency corresponding to the intermediate frequency of amplifiers 13 and 14. Loading resistances 60 are provided in each case to broaden the band of these resonant inductances to avoid excitation of transient oscillations in the network. Capacitors 59 are chosen to provide as much intermediate frequency filtering as possible with a reasonable characteristic impedance (i. e. 1000 ohms). The capacitance of condenser 59a differs from the capacitance of condensers 59 by the amount of the capacitance of cable 48, and resistance 61 terminates artificial transmission line 57 in its characteristic impedance, to avoid reflected waves in this line, as is known to the art.

The sensitivity or gain of electron discharge devices 13 and 14 is varied in accordance with the voltage at points 62 and 63 respectively by means of the connection from these points to the control electrodes of these devices through coils 23 and 25. These devices are chosen of the variable gain or remote cut-off type so that as the negative control electrode bias voltage is increased, the amplification factor and the sensitivity decreases. Thus, as the control wave passes along artificial transmission line 57, the gain of electron discharge devices 13 and 14 is changed in accordance with the value of this wave, the gain being suddenly reduced and then slowly restored in accordance with the setting of variable resistance 53.

The operation of the circuits of Fig. 1 to control the gain of the receiving system can best be understood with reference to Fig. 2 which shows the events during successive pulses of radio frequency energy from antenna 5. In this figure, curve A shows the wave shape of two successive voltage pulses from unit 1, these pulses also corresponding substantially in time and shape to the radio frequency voltage produced by generator 4 and radiated from antenna 5. Solid curve B shows the variation in gain of the pulse-echo receiving system required to compensate for the natural variations in the intensity of radio echoes received from remote objects by antenna 5. That is, if the receiver gain is decreased immediately aftr each radio pulse to the negative peak shown in curve B and then restored at the rate indicated, the amplitude of the unidirectional voltage output of unit 15, Fig. 1, will be substantially independent of the distance to the various remote objects giving rise to that voltage and will vary only in accordance with the radio reflecting properties of these objects. Hence, curve B represents the gain variation curve desired to be obtained.

As explained above in connection with the operation of T. R. box 7, a short time period relative to the pulse rate is required for the discharge gap located therein to deionize. During this time period, the receiver is prevented from receiving any but the strongest incoming signals. For example, the effect on receiver sensitivity due to the T. R. box 7 alone in a typical pulse-echo system might be approximately as shown by the dashed curve 70 superimposed on curve B, Fig. 2, decreasing to zero approximately at point c in time. This effect initially assists the desired sensitivity-time control during the interval a—c, but as will be pointed out below, is ineffective in itself to prevent masking of desired echoes during the time interval b—d on curve B. In accordance with our invention the desired effect is achieved by additionally varying the gain of the receiving system at a substantially constant rate during the interval b—c and at a progressively decreasing rate for a time period c—d thereafter along curve B.

The unidirectional control electrode bias voltage applied to electron discharge devices 13 and 14 is illustrated by curve C, Fig. 2. This voltage consists of two components, first, the constant value associated with the desired constant bias voltage and second, the varying value associated with the time-varying gain control. The value of the former voltage is determined by the voltage of unidirectional voltage source 64, Fig. 1, the values of resistances 65 and 66, and the setting of potentiometer 67. This voltage controls the average level of receiver gain which is adjusted by potentiometer 67 to a value giving optimum system performance under each operating condition.

The varying component of gain control voltage corresponds to wave 45 as changed by the operation of electron discharge device 46 and applied to electron discharge devices 13 and 14. This component is prevented from rising beyond a predetermined negative value by the cut-off characteristic of discharge device 46, represented by the cross-hatched area under curve B. This varying component may further be divided into three portions, first, the increasing voltage portion (a—b, Fig. 2) corresponding to a portion of the time during which condenser 42 is charging through diode 36, second, the constant voltage portion (b—c, Fig. 2) during which electron discharge device 46 is biased beyond cut-off by the coupling capacitor 49 and grid-leak resistance 50 and consequently has no space current flow, and third, the voltage decay portion (c—d, Fig. 2) during which condenser 42 is discharging through resistance 44, and device 46 is not biased to cut-off. The shape of the voltage-decay portion may be varied by adjusting the value of resistance 44. As is well-known, the intensity of received pulses from any given type of reflecting object varies approximately inversely with the fourth power of the distance from the antenna. Therefore, the controls 39, 44 and 53 are adjusted to obtain an over-all sensitivity characteristic for the receiver varying approximately as the fourth power of the distance, i. e., the fourth power of the time interval measured from the transmitter pulse. If properly adjusted, then the amplitude of signals on the display tubes 27 and 28 will be substantially independent of the distance to a given type of reflecting object giving rise to the echoes.

In practice, resistance 39 is adjusted so that the amplitude of the driving pulse applied to capacitor 42 is sufficient to cause device 46 to be cut off during a time interval a—c (Fig. 2) approximately equal to the time for the T. R. box 7 to deionize (along the dashed curve). Then during this interval the effect of the T. R. box is combined with the substantially constant, decreased receiver sensitivity to give approximately an over-all fourth power sensitivity characteristic. This adjustment must be changed for different types and ages of T. R. boxes. Resistance 44 is adjusted so that the sensitivity curve during interval c—d maintains this general fourth-power characteristic. The exact setting in any case is determined by terrain, weather conditions, internal noise level in the equipment and the type of interference encountered. Resistance 53 is adjusted to give proper over-all amplitude of curve C to match receiver gain. This will vary with the control characteristics of tubes 13 and 14.

As an illustration of the operation of our improved system, the gain of the receiving system is normally adjusted so that "noise" and undesired reflections have an amplitude at least three-fourths the saturation level of amplifiers 13 and 14. Weak echoes just above the noise level and at relatively short ranges are then visible on the P. P. I. display while strong echoes are limited so they do not mask the weaker signals and cause indistinct patterns. For example, in a typical shipboard installation, the desired nearby echoes may be from planes, ships or buoys and the undesired echoes from waves ("sea clutter") and shore objects. In one case, echoes within about one-half to one mile were attenuated by the T. R. box and associated lines in conjunction with the substantially constant sensitivity control bias supplied during time interval b—c as shown in Fig. 2. For echoes from objects at from one to 10 miles, the sensitivity was controlled by the exponential shape of the sensitivity-time control curve to give indications dependent only upon the reflecting properties of the objects and substantially independent of their distance. Beyond this range, the sensitivity of the receiving system was maximum to permit detection of weak echoes up to 100 miles or more.

Another feature of our invention resides in the filtering action of artificial transmission 57. This action prevents interstage coupling between the amplifier stages connected to the transmission line and simultaneously prevents coupling through the line to cable 48. We are thus enabled to isolate the time-varying, gain-control voltages from the signal voltages in the intermediate frequency amplifier. In addition, it is possible to vary the gain of more than one stage of the intermediate frequency amplifier in accordance with the time-varying, gain voltage, thereby increasing the effectiveness of the gain variation associated with this voltage. Since this transmission line does not influence the wave form of the waves applied thereto, this isolation is accomplished without distorting the wave shape of the control voltages.

By way of an illustrative example to indicate a practical application of the principles of our invention to a pulse-echo remote object detecting system, we have built and operated a system employing the following circuit constants:

Resistance 37=70 ohms
Cable 38=70 ohms characteristic impedance
Potentiometer 39=50 ohms
Resistance 41=22 ohms
Electron discharge device 36—Type 6X5
Capacitor 42=1500 micromicrofarads
Capacitor 49=.002 microfarad
Resistance 43=220 ohms
Resistance 44=100,000 ohms
Resistance 50=1 megohm
Resistance 53=7000 ohms
Inductance 59=17.5 microhenries
Capacitors 58=100 micromicrofarads
Resistance 60=2000 ohms
Resistance 61=1000 ohms While we have illustrated and described a particular embodiment of our invention, it will, of course, be understood that we do not wish to be limited thereto since various modifications both in the circuit arrangements and in the instrumentalities employed may be made, and we contemplate by the appended claims to cover any such modifications as fall within the true spirit and scope of our invention.

What we claim as new and desire to secure by Letters Patent of the United States is:

1. The combination, in a system for determining the distance of objects, of means for projecting energy pulses thereto, a receiver of pulses emanating from said objects upon impingement thereon of said first named pulses, means to prevent said first mentioned pulses from overloading said receiver, said last means including a discharge gap disposed to break down when said first pulses take place, integrating means responsive to each projected pulse for developing a unidirectional voltage pulse of unsymmetrical peaked waveform, said voltage pulse increasing relatively rapidly to a peak during said projected pulse and then decreasing relatively more slowly thereafter, means to limit the amplitude of said voltage pulse to a predetermined clipping level and including means to control the D. C. level, thereby to provide a resultant pulse having a substantially constant maximum voltage portion as long as said voltage pulse exceeds said clipping level, means for adjusting said limiting means independently to vary said clipping level, and means controlled by said resultant pulse to vary the sensitivity of said receiver with time, said clipping level being so adjusted that said last means maintains the receiver sensitivity at a substantially constant low level during at least the time said gap is deionizing and then increases the receiver sensitivity continuously during a period of time immediately thereafter.

2. In a detecting system having a transmitter to produce recurrent energy pulses and a receiver to detect said pulses as reflected by remote objects, means to reduce the sensitivity of said receiver during said transmitted pulses and to restore the sensitivity thereof with time thereafter, a condenser, means to charge said condenser relatively rapidly at the instants of initiation of said first pulses, means to discharge said condenser relatively more slowly at the instants of termination of said first pulses, thus to produce a time-varying unsymmetrical peaked voltage thereacross, means to clip said voltage, said last means producing a resultant voltage substantially proportional to said peaked voltage up to a predetermined limit and a substantially constant voltage when said first voltage exceeds said limit, means for adjusting said clipping means independently to vary said voltage limit, and means to continuously control the gain of said receiver in accord with the resultant voltage of said last means.

3. In a detecting system having a transmitter to produce recurrent energy pulses and a receiver to detect said pulses as reflected by remote objects, means to reduce the sensitivity of said receiver during said transmitted pulses, said means including a discharge gap disposed to break down when said first pulses take place, a condenser, means comprising a charging circuit of short time constant as compared to the duration of said first pulses to charge said condenser rapidly at the instants of initiation of said first pulses, means comprising a discharge circuit of substantially longer time constant to discharge said condenser more slowly at the instants of termination of said first pulses, thus to produce a time-varying unsymmetrical peaked voltage thereacross, means to clip said voltage, said last means producing a resultant voltage substantially proportional to said peaked voltage up to a predetermined limit and a constant voltage when said peaked voltage exceeds said limit, means for adjusting said clipping means independently to vary said voltage limit, and means to reduce the gain of said receiver in accordance with the resultant voltage of said last means.

4. In a detecting system having a transmitter to produce recurrent energy pulses and a receiver to detect said pulses as reflected by remote objects, means to reduce the sensitivity of said receiver during said transmitted pulses, said means including a discharge gap disposed to break down when said first pulses take place, a condenser, means to charge said condenser rapidly at the instants of initiation of said first pulses, means to discharge said condenser more slowly at the instants of termination of said first pulses, thus to produce a time-varying unsymmetrical peaked voltage thereacross, amplitude limiting means responsive to said time-varying voltage to produce a substantially constant potential so long as said time-varying voltage exceeds a predetermined level and a varying potential directly proportional to said time-varying voltage so long as it is below said level, means for adjusting said amplitude-limiting means independently to vary said voltage level, and means to reduce the gain of said receiver in accordance with said potentials, the receiver gain being maintained at a relatively low minimum value in response to said substantially constant potential.

5. The combination, in a system for determining the distance of objects, of a transmitter of projected pulses of a predetermined frequency, a receiver for pulses of said frequency having a plurality of amplifying stages, means to attenuate projected pulses received directly by said receiver and second means to vary the amplification of said stages with time, said second means supplying gain control voltages having a substantially constant value during said projected pulses and a progressively decreasing value for a time period thereafter, an artificial transmission line, means to supply said voltages to the input of said artificial transmission line, said line including series-connected resonant elements resonating at said frequency, and means to impress gain-control voltages from said line upon said plurality of stages, said last means including a connection from each of said stages to a point on said line separated from other gain control connection points by at least one of said resonant elements.

6. In combination, an amplifier having a plurality of stages arranged to amplify signals of predetermined frequency, each of said stages having sensitivity determined by an applied voltage, a source of voltage varying with time in accordance with a desired variation in the gain of said amplifier, an artificial transmission line connected to said source, said line including series-connected resonant elements having resonant frequency corresponding to said predetermined frequency, and means connecting a plurality of said stages to said line to supply said applied voltage, said connections being to points on said line separated by at least one of said resonant elements.

7. In combination, an amplifier having a plurality of stages arranged to amplify signals of predetermined frequency, each of said stages having an electron discharge device of the variable gain type, a source of voltage varying with time in accord with a desired variation in the gain of said amplifier, an artificial transmission line terminated in its characteristic impedance and connected at its open end to said source, said line including series-connected resonant elements having resonant frequency corresponding to said predetermined frequency, and means connected a plurality of said devices to said line to vary the gain thereof in accord with the potential at the point of connection to said line, said points of connection being separated by at least one of said resonant elements from each other and from the open end of said line.

8. The combination, in a system for determining the distance of objects, of means for projecting energy pulses thereto, a receiver of pulses emanating from said objects upon impingement thereon of said first-named pulses, integrating means responsive to each projected pulse for developing a unidirectional voltage pulse having unsymmetrical positive-and negative-going portions, said voltage pulse increasing relatively rapidly to a peak during said projected pulse and then decreasing relatively more slowly thereafter, means to limit the amplitude of said voltage pulse to a predetermined clipping level and to provide a resultant pulse having a substantially constant maximum voltage portion as long as said voltage pulse exceeds said level, means for adjusting said limiting means to vary said clipping level independently of the form of the positive- and negative-going portions of said voltage pulse, thereby to control the duration of said maximum voltage portion, and means controlled by said resultant pulse to vary the sensitivity of said receiver with time.

9. The combination, in a system for determining the distance of object, of means for projecting energy pulses thereto, a receiver of pulses emanating from said objects upon impingement thereon of said first-named pulses, means to prevent said first-named pulses from overloading said receiver, said last means including a discharge gap disposed to break down when said first pulses take place, means responsive to each projected pulse for developing a unidirectional voltage pulse having a leading edge increasing relatively rapidly to a peak during said projected pulse and a trailing edge decreasing relatively more slowly thereafter, means to limit the amplitude of said voltage pulse to a predetermined clipping level and to provide a resultant pulse having a substantially constant maximum voltage portion as long as said voltage pulse exceeds said level, means for adjusting said limiting means to vary said clipping level, thereby to control the duration of said maximum voltage portion independently of the forms of the leading and trailing edges of said voltage pulse, and means controlled by said resultant pulse to vary the sensitivity of said receiver with time, said clipping level being so adjusted that said last means maintains the receiver sensitivity at a substantially constant low level during at least the time said gap is deionizing and then increases the receiver sensitivity continuously during a period of time immediately thereafter.

JOHN E. MAYNARD.
RICHARD L. SHETLER.

REFERENCES CITED

The following references are of record in the file of this patent:

UNITED STATES PATENTS

| Number | Name | Date |
|---|---|---|
| 2,145,332 | Bedford (2) | Jan. 31, 1939 |
| 2,167,492 | Sproule | July 25, 1939 |
| 2,411,572 | Hershberger | Nov. 26, 1946 |
| 2,422,190 | Fiske | June 17, 1947 |
| 2,422,334 | Bedford (1) | June 17, 1947 |
| 2,427,523 | Dolberg | Sept. 16, 1947 |
| 2,456,952 | Kluender | Dec. 21, 1948 |
| 2,498,381 | Smith | Feb. 21, 1950 |